Oct. 1, 1968    R. G. BRYER    3,404,272
RADIATION SENSITIVE DEVICES
Filed May 15, 1964    5 Sheets-Sheet 2

INVENTOR
Robert George Bryer
BY
Pierce, Scheffler & Parker
ATTORNEYS

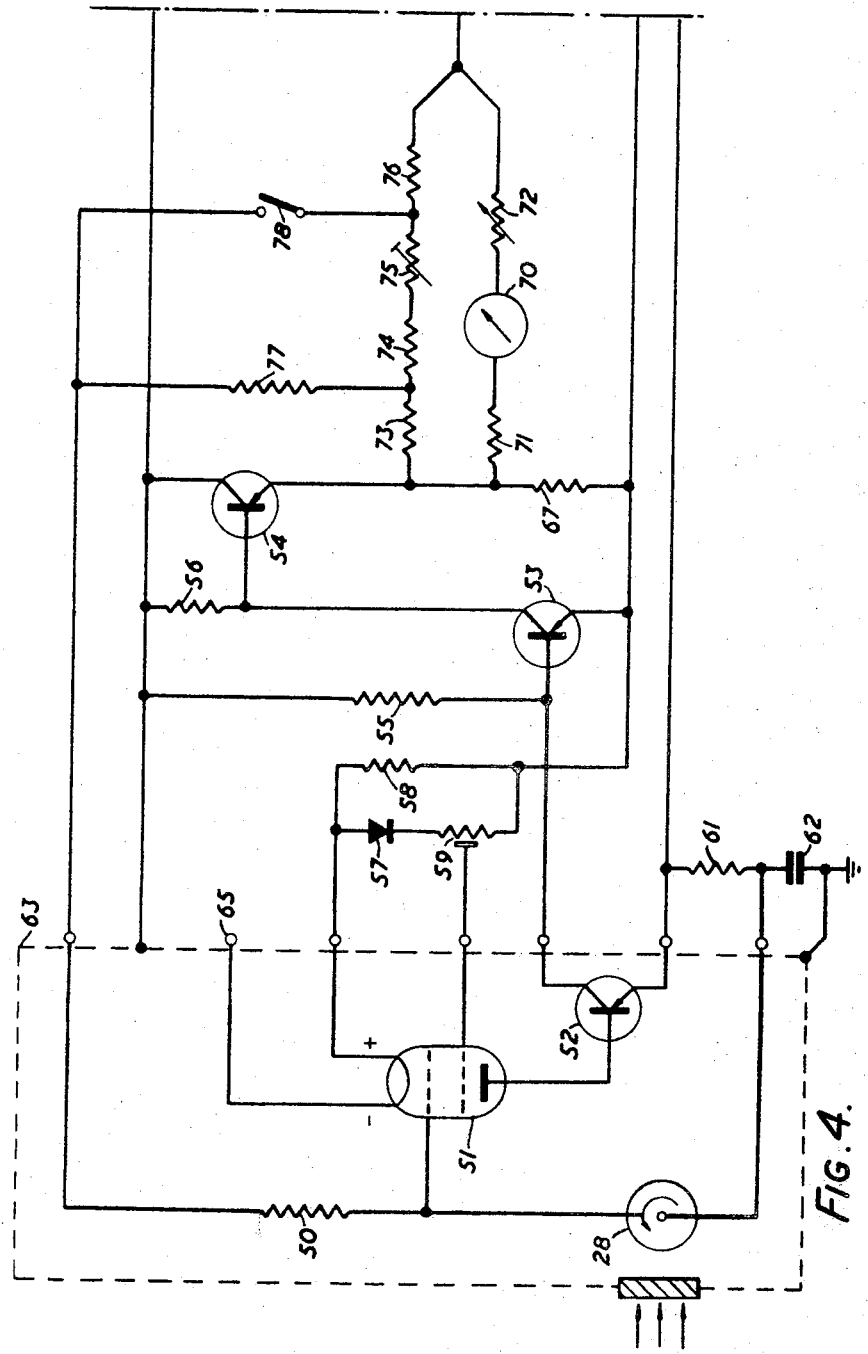

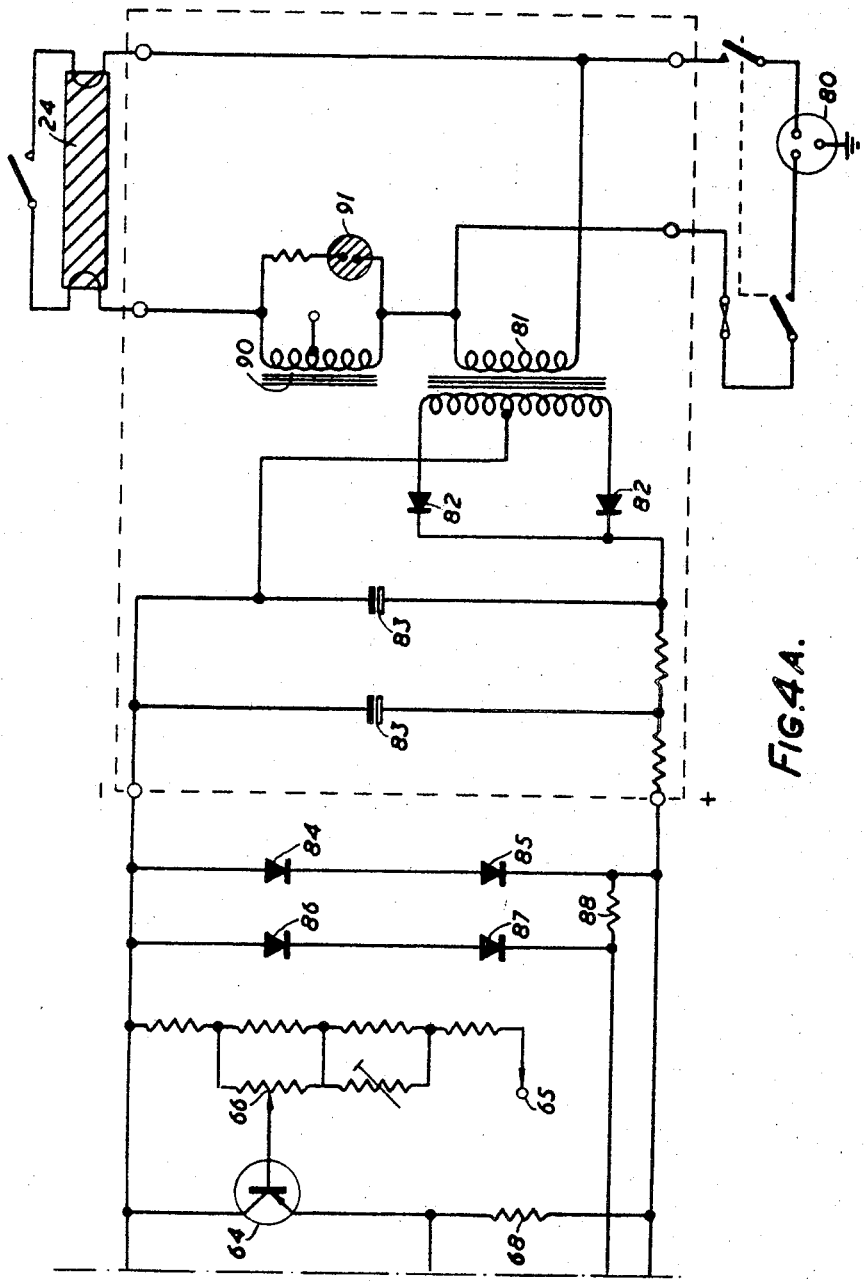

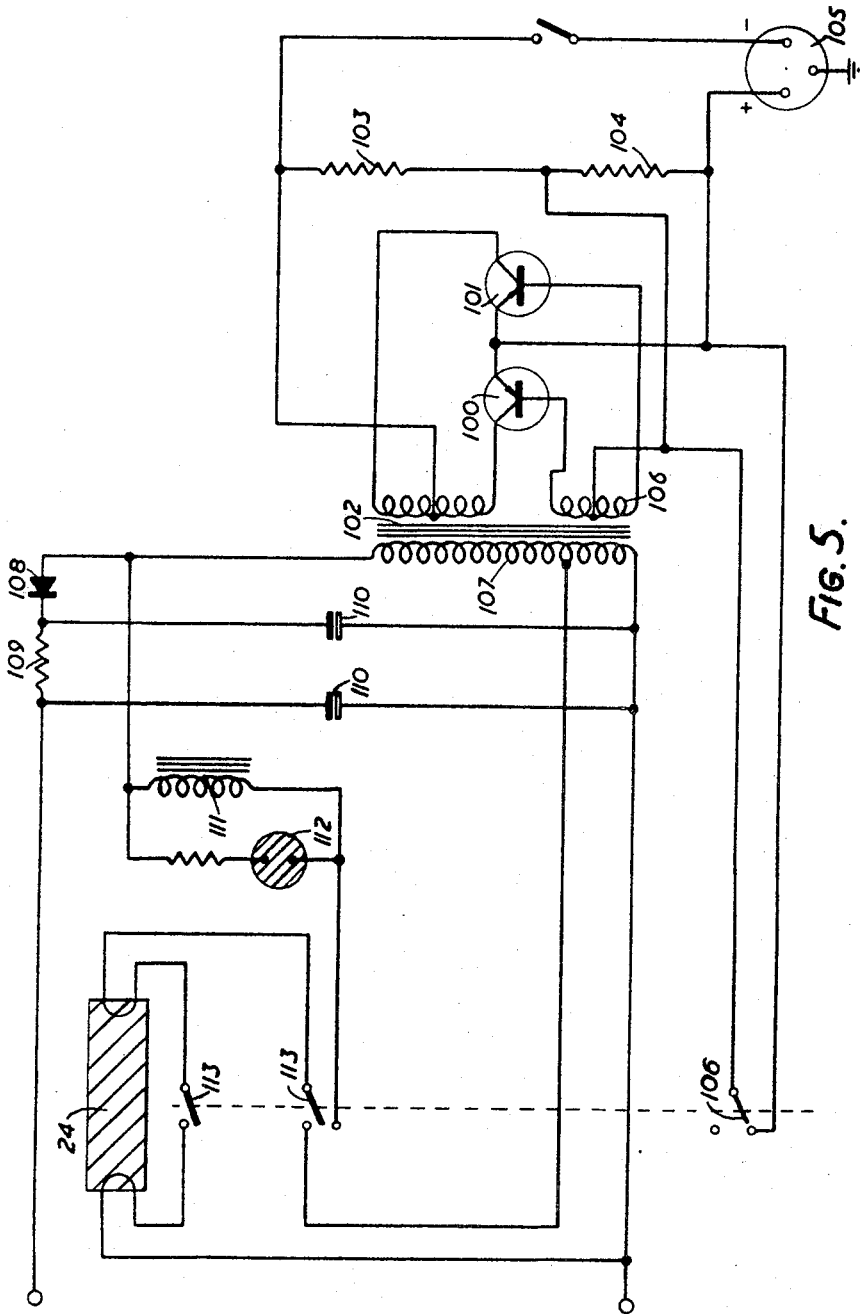

3,404,272
RADIATION SENSITIVE DEVICES
Robert G. Bryer, Ruislip, Middlesex, England, assignor to
R. A. Stephen and Company Limited
Filed May 15, 1964, Ser. No. 367,627
Claims priority, application Great Britain, May 22, 1963,
20,378/63
7 Claims. (Cl. 250—83)

This invention relates to apparatus for use with dosimeters of the type which employ a radiation sensitive element, the effect of radiation upon which is not directly observable.

The present invention relates to apparatus for examining an element of this kind to determine the extent to which the material of the element has been subjected to radiation.

On suitable material for an element of this kind is a phosphate glass, including silver metaphosphate. In such a glass, the positively charged silver ions are capable of absorbing ultra violet light energy in a band having a peak at 2400 A. and when subjected to light in this band emit light in a band centered around 3700 A. However after exposure to X-ray or gamma radiation electrons are liberated in the glass which combine with the silver ions to form a new luminescent center of neutral silver atoms which can absorb ultra violet in a band around 3300 A. and under such conditions emit orange light in a band with a peak at 6400 A. The intensity of emission in this latter band is a function of the amount of penetrating radiation absorbed, which permits the material to be used as the radiation sensitive means.

It is an object of the present invention to provide a dosimeter-measuring apparatus of the above type having improved means whereby an element of the glass material can be quickly and easily inserted in the apparatus and examined or compared with a reference element.

In accordance with a broad aspect of the present invention, there is provided a dosimeter-measuring apparatus comprising a receptacle for receiving a radiation-sensitive element and adapted to permit radiation to fall on said element from one direction and to allow radiation to emerge from the element in a different direction, a carriage member for supporting reference and specimen radiation-sensitive elements and movable between two positions in which said elements are alternately adjacent said receptacle, and means for moving said elements alternately into said receptacle.

In accordance with a narrower aspect of the invention, there is provided a dosimeter-measuring apparatus comprising a receptacle for receiving a radiation-sensitive element and adapted to permit radiation to fall on said element from one direction and to allow radiation to emerge from the element in a different direction, a carriage member for supporting reference and specimen radiation-sensitive elements and linearly movable between two positions in which said elements are alternately adjacent said receptacle and means for moving said elements alternately in a direction substantially at right angles to the direction of movement of said carriage member and into said receptacle.

Features and advantages of the invention will be apparent from the following description of an embodiment thereof, given, by way of example, in conjunction with the accompanying drawings, in which:

FIGURES 4 and 4A is the circuit diagram of the apparatus, and

FIGURE 5 is a circuit diagram of an alternative power supply for the apparatus.

Figure 1:
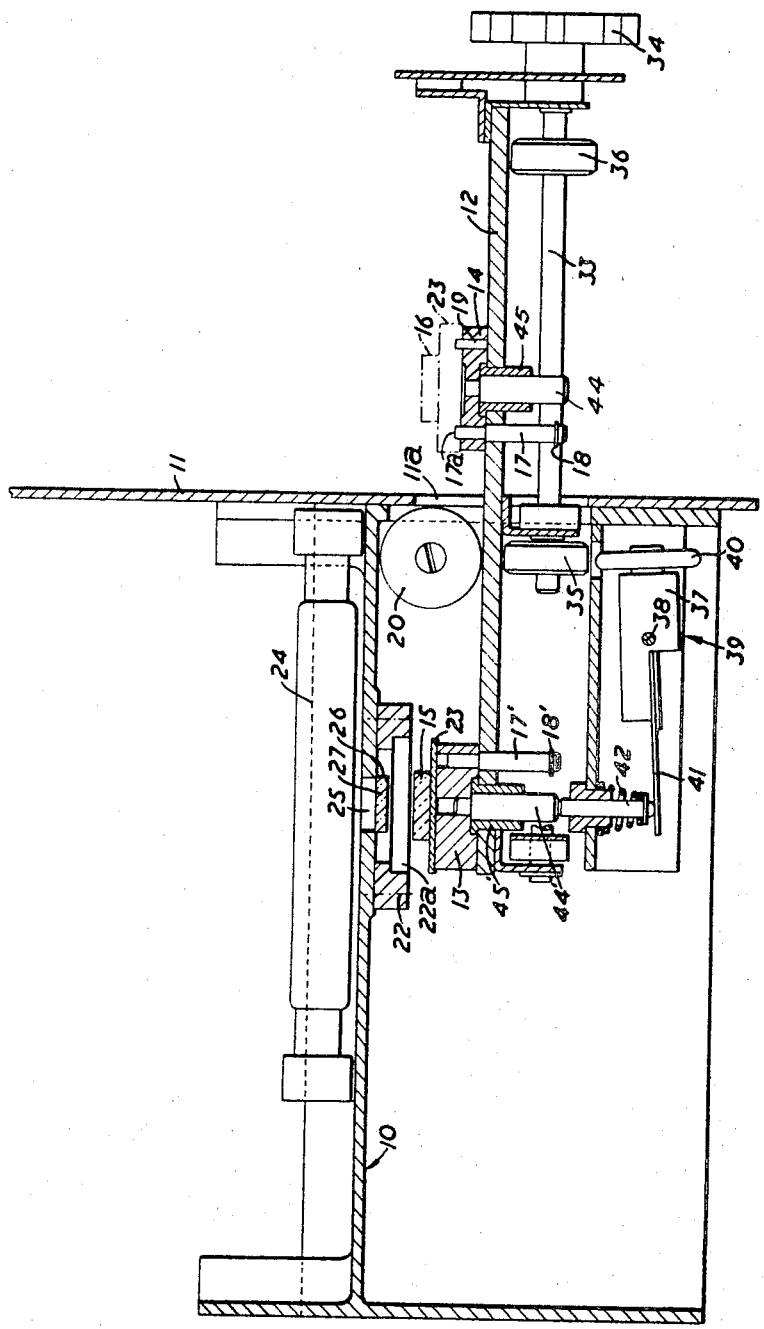
FIGURE 1 is a sectional view taken along the line 1—1 in FIGURE 3, of a dosimeter-measuring apparatus in accordance with the present invention; the electrical components of the apparatus are omitted.
Figure 2:
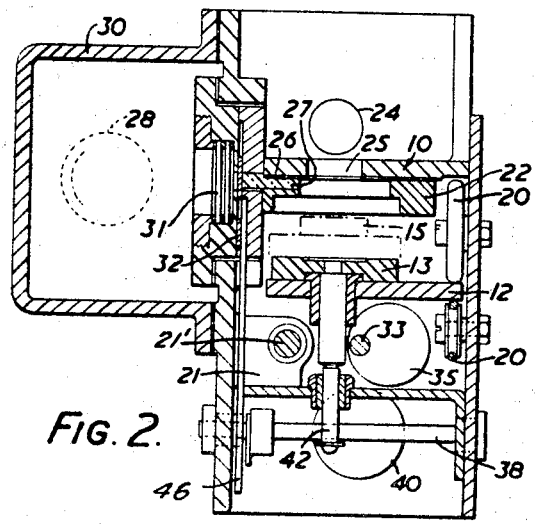
FIGURE 2 is a section taken along the line 2—2 in FIGURE 3.
Figure 3:
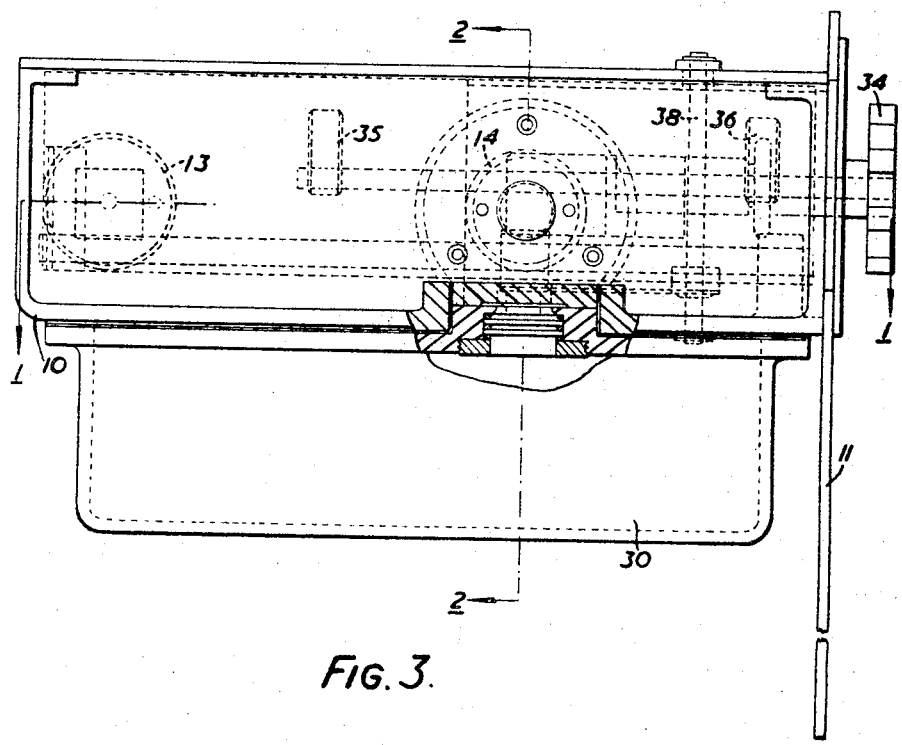
FIGURE 3 is a plan view of the apparatus.

Referring to FIGS. 1–3 apparatus comprises a housing 10, a front plate 11, and a draw-out dosimeter holder 12 movable in an aperture 11a in the front plate. Positioned on the holder are two annular platforms 13 and 14 for receiving the reference glass block 15 and the specimen glass block 16 respectively; the platforms are prevented from rotating by pins 17 and 17' but are capable of movement in a direction which is upward in FIGURES 1 and 2, upward movement being limited by stops 18 and 18' on pins 17 and 17'. Platform 14 in addition has portion 17a of its pin 17 and a pin 19 projecting above the surface of the platform for locating the glass block 16. The holder 12 is slidable between upper and lower rollers 20 attached to the housing and includes a shaft 21' slidable in bearings 21; the holder has two limit positions, one position in which platform 13 is in vertical alignment wth an open-ended receptacle 22, i.e. the position shown in FIGURE 1, and the other position in which platform 14 is so aligned. A small amount of vertical clearance is provided between receptacle 22 and glass blocks 15 and 16.

The receptacle 22 is secured to housing 10 and is shaped to receive the glass blocks when they are raised, by means described later, into a test position; in this position aperture 22a of the receptacle is closed by the plate 23 carrying the reference glass block or specimen block. An ultra violet light source 24 is disposed above an upper window 25 in the receptacle, and a second, side window 26 permits, with the aid of a light-guide 27, radiation from the glass block to fall onto a photo-cell 28 located in a further housing 30; colour filters 31 and a movable shutter 32 are interposed. A further optical vlter or filters (not shown) are also interposed between the light source 24 and the glass blocks and are designed substantially to confine the exciting ultra violet light to wavelengths between 3000 A. and 5000 A.; filters 31 are designed substantially to exclude light having a wavelength shorter than 5000 A.

To raise the glass blocks into the receptacle 22, a shaft 33 rotatable by control knob 34 is mounted on the under side of holder 12 and carries a pair of spaced cams 35, 36 which co-operate, in the limit positions of the holder with a rocker assembly generally shown by the reference numeral 39 and supported by the housing 10; the rocker assembly in turn co-operates with platforms 13 and 14. The rocker assembly comprises a member 37 fixed on shaft 38 for angular rotation therewith and carrying at one end a roller 40 for engaging with cams 35, 36 and at the other end a leaf spring 41 engaging a spring biased pin 42. Secured in the central bore of each platform is the reduced upper portion of a pin 44 or 44' slidably mounted in a bush 45 or 45' secured in holder 12 and can be brought into vertical alignment with pin 42 when the holder is moved into its limit positions.

Associated with the rocker assembly 39 is a rod 46 coupled at one end to shaft 38 by means of a lever and lost motion device (not shown) and at the other end to the movable shutter 32.

To bring a specimen glass block to the test position; the holder 12 is drawn out to the position shown in FIGURE 1, and the specimen and its holder located on platform 14 by pin 17a and 19; the holder is then returned to its inner limit position and control knob 34 angularly rotated and locked.

Angular rotation of knob 34 causes cams 35 and 36 to rotate, rocker member 37 to angularly rotate in a clockwise direction due to engagement of roller 40 with cam 36, and pin 42 to move upwardly against its bias and to engage pin 44 thereby upwardly moving the platform 14 and glass block 16 until the specimen is positioned within receptacle 22.

Angular rotation of member 37 and shaft 38 also causes an upward movement of rod 46 which moves shutter 32 to its upper position; the aperture controlled by the shutter is now open to permit radiation from the specimen to impinge on the photo-cell 28.

The apparatus is now ready for a test reading to be taken; details of the method, and arrangement, for carrying out the test will not be described since they do not form part of the present invention.

To prepare the apparatus to receive a further specimen glass block, the above procedure is reversed.

Whilst the holder is in the position shown in FIGURE 1, a test reading of the reference glass block may be made; the procedure is similar to that already described with the exception that cam 35 engages roller 40.

A dosimeter suitable to be used with the above described apparatus is disclosed in our co-pending application Ser. No. 282,039 filed May 21, 1963 to which attention is directed. Briefly the dosimeter comprises a housing having a casing and lid screw threaded together to enclose a radiation-sensitive glass-block; the block is secured to the lid. To expose the glass block for a test, the dosimeter is located, unopened, on platform 14, holes in the lid engaging pins 17a and 19 and the casing in them unscrewed from the lid.

FIGURES 4 and 4A show the circuit arrangement of one form of amplifying and measuring means suitable for use in the apparatus shown in FIGURES 1 to 3. In this circuit arrangement, the photo-electric cell 28 is of the photo-resistive type, and is arranged in series with a resistor 50 of high value across a voltage supply, so to control the control grid voltage of an electrometer valve 51. When light falls upon the photo-cell 28, its resistance will change and thereby to change the voltage applied to the grid of valve 51; in turn, the anode current of the valve will be changed. The direct current change thus produced is amplified by a direct current amplifier which includes three transistors 52, 53 and 54. The emitter-base path of transistor 52 is included in the anode circuit of the valve 51, and the output of transistor 52 is applied directly to the base-emitter input of transistor 53; the transistor 53 has its base normally biased by a current through resistor 55. The collector of transistor 53 includes a load resistor 56, the collector of 53 being connected directly to the base of transistor 54. The screen grid potential of the valve 51 is stabilised by means of a Zener diode 57, together with a fixed resistor 58 and variable resistor 59. Also, the current to the photo-cell 28 is decoupled by means of a series resistor 61 and by-pass capacitor 62. As indicated by the broken line 63, the electrometer valve, and with it the cell 28, are preferably enclosed.

The transistor 54 forms part of a bridge circuit, which includes also a further transistor 64. The base current of this last transistor is determined by a network of resistors which serve both to provide a suitable filament current for the electrometer valve 51, the network being connected to a terminal 65, which is also connected, as indicated in the diagram, to the terminal of the valve filament. This network also includes an adjustable resistor 66. The two transistors 54 and 64 in effect form a bridge circuit, the bridge being completed by a resistor 67 in series with the transistor 54, and a resistor 68 in series with transistor 64; connected across the diagonal of the transformed bridge are two parallel circuits of which one includes an indicating instrument 70 in series with two resistors 71 and 72, whilst the other circuit includes four resistors 73 to 76. The two resistors 74 and 75 are shunted by a high resistance 77 and switch 78, the high value resistor 50 included in the bridge circuit of the electrometer valve 51 being returned to the one end of resistor 77, thereby to provide negative feedback from the output of transistor 54 to the input of valve 51.

Initially, the bridge can be balanced, for example by adjustment of the variable resistor 66; should there then be a change in the direct current conditions affecting the valve 51, the transistor 54 will change its collector current, and thereby disturb the balance of the bridge, giving rise to an indication in the meter 70. The overall gain of the D.C. amplifier including transistors 52, 53 and 54 will be affected by the degree of negative feedback which is produced by means of the resistors 73 to 77 and depending upon the setting of switch 78. When the switch is closed, the feedback ratio is altered, the settable resistor 75 affording a degree of control of feedback and hence sensitivity in that position of switch 78 where its contacts are open.

In FIGURES 4 and 4A, the circuits described are shown as being supplied from alternating current mains, connected to an input plug 80. A main transformer 81 has a secondary winding which feeds a full wave rectifier circuit 82, with a filter circuit indicator generally at 83. The smoothed output from the filter is applied to a voltage stabilising circuit which includes two Zener diodes 84, 85, and two further such Zener diodes 86 and 87, with an interconnecting resistor 88. By this means there is obtained two stable voltages. The ultra violet lamp 24 is supplied from plug 80 through a control choke 90 shunted by a stabilising discharge tube 91.

It is advantageous if the Zener diode 57, used for supplying the screen voltage of the electrometer valve, has a negative temperature coefficient; small variations of screen voltage due to small variations of the Zener diode voltage will cause changes of gain in the electrometer valve and this change of gain can be used to offset the effect of the slight positive temperature coefficient of the other Zener diodes.

FIGURE 5 shows a power supply suitable for feeding the circuits of FIGURES 4 and 4A, but from a direct current supply such as an accumulator, instead of the alternating current supply. The power supply unit shown in FIGURE 5 comprises two transistors arranged in a push-pull oscillator circuit; the transistors 100 and 101 are associated with a coupling and frequency determining transformer 102. The base current of the two transistors is determined by a potential divider comprising resistors 103, 104, connected across direct current supply applied to input socket 105 and the coupling to the bases of the two transistors, by means of a coupling winding 106 on transformer 102 is such as to cause the two transistors to operate to produce approximately square waves. Sometimes a circuit of the type described will not always start oscillating of its own accord, and for this reason a push-to-start switch 106 can be arranged to modify temporarily the base current of the two transistors.

The output winding 107 of the transformer 102 is rectified by means of a rectifier 108 and smoothed by means of resistor 109 and capacitors 110. This provides the necessary smoothed direct current supply for the transistors included in the circuit of FIGURES 4 and 4A. The transformer 102 is used to supply also the ultra-violet lamp 24 and the alternating current output of the transformer is used for this purpose, fed through a control choke 111, shunted by a discharge tube 112, corresponding to discharge tube 91. The push-to-start switch 107 may have contacts 113 and 114 which are used to control also the supply to the lamp 24.

What is claimed is:

1. A dosimeter measuring device comprising a housing, receptacle-defining means supported within the housing for receiving a radiation-sensitive element in said receptacle and having a first window for permitting radiation to fall on an element in said receptacle from one direction and a second window to allow radiation to emerge from the element in a different direction, means for sensing the radiation in said different direction, light guide means for directing the radiation in said different direction from said second window to said sensing means, a draw-out holder rectilinearly movable in an access aperture in the housing and between two limit positions, two platforms carried by said holder for supporting reference and specimen radiation sensitive elements, said platforms being spaced so that in one limit position of the holder the reference element can be positioned adjacent the receptacle-defining means whilst the specimen element can be loaded onto or unloaded from the holder externally of the housing and in the other limit position the specimen element is positioned adjacent the receptacle-defining means, and manually operated cam means carried by said holder and operative to lift each said platform when positioned with its associated element adjacent said receptacle defining means whereby to position said element in said receptacle to close said receptacle in light sealing relationship from the interior of the housing accommodating said draw-out holder.

2. A dosimeter measuring apparatus comprising receptacle-defining means for receiving a radiation-sensitive element in said receptacle and having a first window for permitting radiation to fall on an element in said receptacle from one direction and a second window to allow radiation to emerge from the element in a different direction, carriage means for supporting reference and specimen radiation-sensitive elements and rectilinearly movable between two limit positions, in one limit position of the carriage the reference element is positioned adjacent the receptacle-defining means whilst the specimen element can be loaded onto or unloaded from the carriage means and in the other limit position the specimen element is positioned adjacent the receptacle-defining means, and means for lifting each of said elements when adjacent the receptacle-defining means into the receptacle.

3. Apparatus according to claim 2 wherein said carriage means includes a support member and a pair of spaced platforms on which said elements may be located, said platforms being movable away from said support member.

4. Apparatus according to claim 3 and including manually operated cam means associated with said carriage means and operative to lift, each said platform when positioned with its associated element adjacent said receptacle-defining means.

5. Apparatus according to claim 4, wherein said cam means comprises a rotatable shaft carrying a pair of spaced cams and attached to said carriage member, one cam being effective for each position.

6. Apparatus according to claim 5, and including a pivotally mounted member supported by said casing and associated with said cams, pivotal movement of said member causing said platforms to be lifted away from the carriage member.

7. Apparatus according to claim 6 and including a radiation-measuring device and shutter means interposed between said device and said second window, movement of each said element away from said support member and into said receptacle causing said shutter means to open and to permit the measuring device to receive radiation from the element.

References Cited

UNITED STATES PATENTS

| | | | |
|---|---|---|---|
| 2,551,542 | 5/1951 | Marsh et al. | 250—71 |
| 2,866,904 | 12/1958 | Hoellerich et al. | 250—71 |
| 3,322,958 | 5/1967 | Heiss | 250—106 |

RALPH G. NILSON, *Primary Examiner.*

A. B. CROFT, *Assistant Examiner.*